Feb. 4, 1936.                A. Y. DODGE                2,029,862
                          ELECTRICAL DISK BRAKE
                         Filed Jan. 17, 1935         2 Sheets-Sheet 2
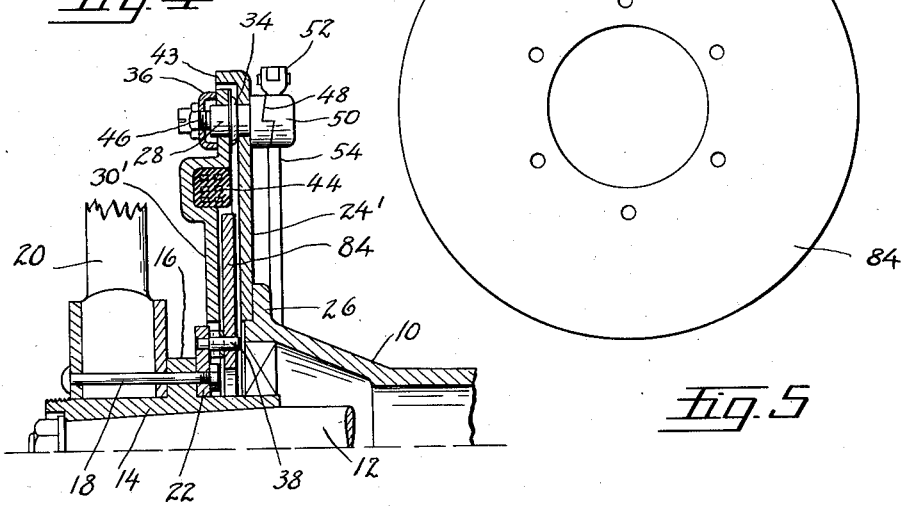
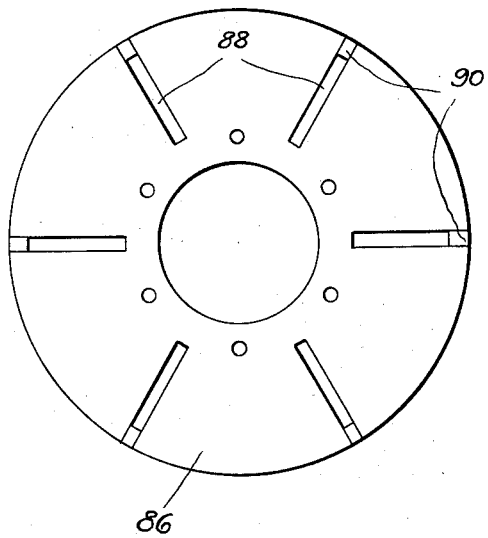
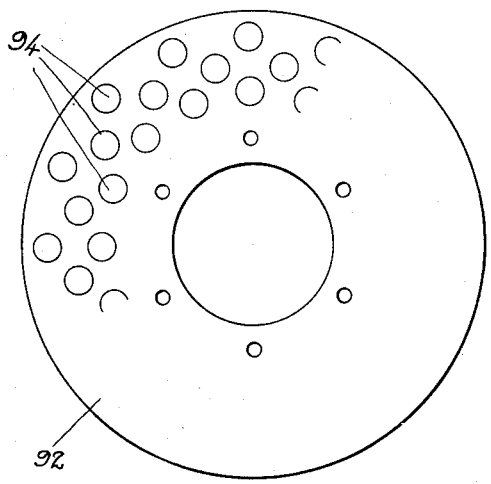
INVENTOR.
Adiel Y. Dodge
BY
Burton & McConkey
ATTORNEYS.

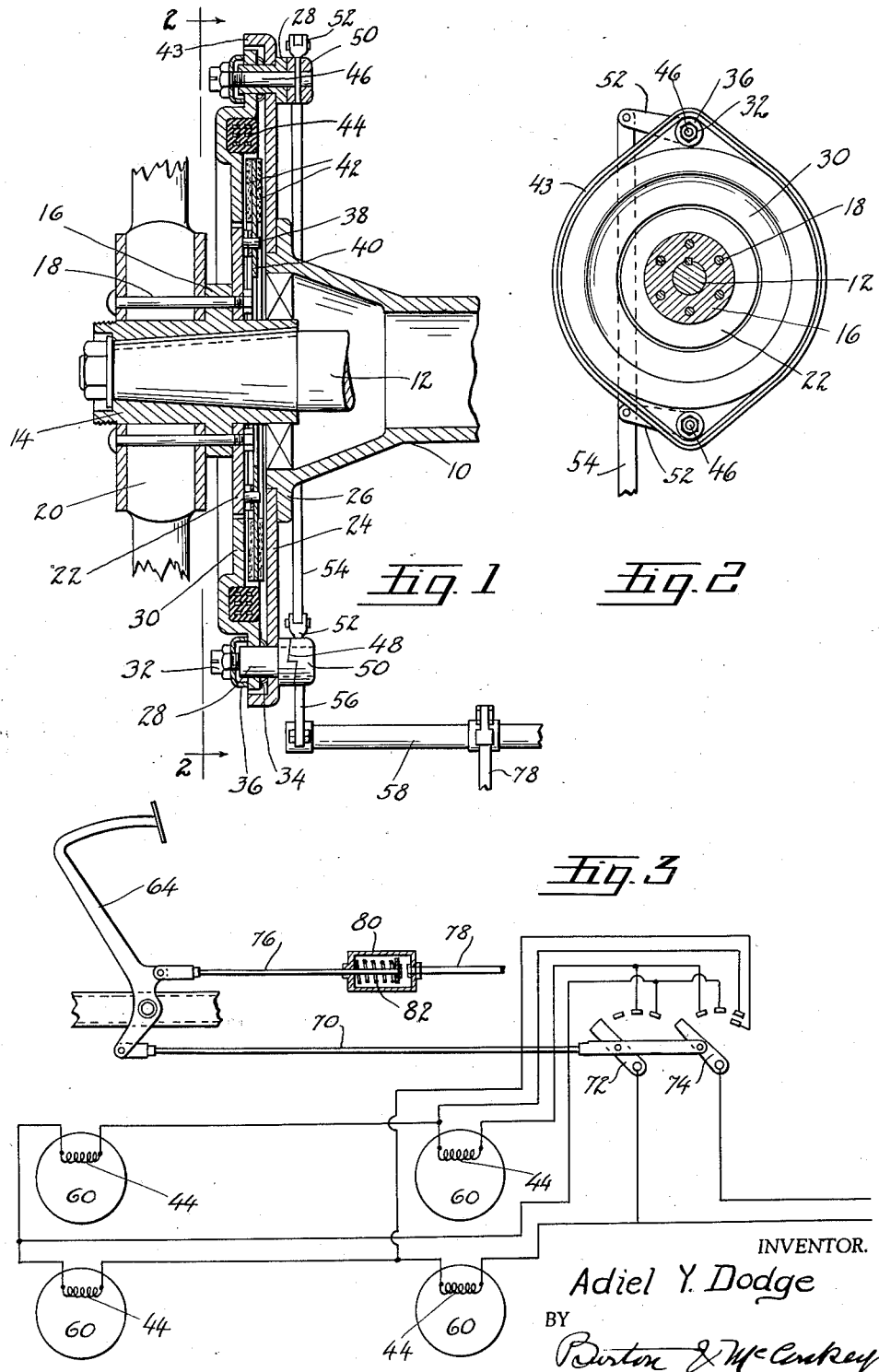

Patented Feb. 4, 1936

2,029,862

UNITED STATES PATENT OFFICE 2,029,862

ELECTRICAL DISK BRAKE

Adiel Y. Dodge, South Bend, Ind., assignor to Bendix Brake Company, South Bend, Ind., a corporation of Illinois Application January 17, 1935, Serial No. 2,245

17 Claims. (Cl. 188—164)

My invention relates to automotive vehicle brake systems and has particular reference to an improved magnetic disk brake assembly and means for controlling the actuation of the same in proportion with the manual effort exerted by the vehicle operator. This application is a continuation in part of my copending application Patent No. 1,991,498 filed September 12, 1930.

An object of this invention is to provide an improved magnetically actuated brake structure of extremely simple design. In my copending application I have described a brake structure including a plurality of alternately rotatable and non-rotatable interleaved friction elements. An electric power device associated with these elements attracts them in close frictional contact to retard the rotation of the elements. A mechanical brake operating mechanism cooperates with the power device and controls the operation of the same.

Magnetic disk brakes have been utilized heretofore but I propose to increase the efficiency of operation of such brakes, not only by virtue of the particular arrangement of parts involved, but by forming the magnetically actuated friction elements or disks of alternately permanent and non-permanent magnetic qualities. To accomplish this end I propose to construct the elements of ferrous metal containing alternately a high and a low carbon content. The arrangement may consist of steel disks of alternately high and low carbon content or it may consist of cast iron disks interleaved with hardened steel disks of high carbon content. Not only does this arrangement provide for better wear of the metal disks, but it also enables a greater braking force to be exerted on the disks by reason of the fact that the high carbon steel disks are permanently magnetic for practical purposes and assist in the compression of the disks together. This is particularly true when mechanical brake application is undertaken without the assistance of the power device.

It is a further object of my invention to provide a novel magnetic relationship for metal disk brakes which assists materially in retarding the speed of the rotating elements. By employing friction disks of comparatively permanent magnetic qualities, a magnetic reaction is produced between the rotating and non-rotating magnetic fields tending to retard the rotating elements. By cutting the magnetic flux in this manner a novel magnetic braking force is provided for decreasing the speed of vehicles. This magnetic force is auxiliary to the frictional force of the disks.

An additional meritorious feature of my invention resides in the use of spring steel metal washers for the purpose of normally retaining the friction disks in spaced apart relation. These steel washers may be in the form of an annular steel stamping or may be comprised of a series of segments extending all around the disks. In addition these washers are magnetically permeable and form a magnetic conductor to assist in closing the magnetic circuit through the friction disks. Thus the effective strength of the magnetism is still further increased for a given strength of current.

Various other meritorious features of my invention will be apparent from the following description taken in conjunction with the drawings wherein like numerals refer to like parts throughout the several figures and wherein:

Figure 1 is a vertical section through my improved friction disk brake assembly, Fig. 2 is a side elevation thereof, Fig. 3 illustrates somewhat diagrammatically my improved brake circuit control mechanism, Fig. 4 is a vertical section through the upper half of a modification of my improved friction disk brake assembly, Fig. 5 is an elevation of a friction disk adapted for use in the brake assembly, Fig. 6 is an elevation of another friction disk adapted for use in the brake assembly, and Fig. 7 is an elevation of a third friction disk adapted for use in the brake assembly.

Referring to the drawings, numeral 10 represents the axle housing in which is journalled the axle 12 and the wheel hub 14 is keyed to the said axle for rotation therewith. Secured to opposite sides of an annular flange 16 on the hub 14 by means of bolts 18 is the wheel 20 and an annular disk plate 22, which latter assists in forming an outer closure for the friction disk brake mechanism.

A backing plate 24 is secured against rotation upon the axle housing 10 against the annular flange 26. Sleeve studs 28 extend through fixed backing plate 24 at spaced apart points about its periphery and are fixedly secured by suitable means against rotation. These studs are located at diametrically opposed points in the preferred form clearly illustrated in Fig. 2. Studs 28 constitute sleeves for bolts 46, and the studs support an annular ring disk member 30 which is retained thereon by the nuts 32. Steel spring metal washers 34 of concavo-convex form are seated upon the intermediate portion of the studs 28 and function to retain plates 24 and 30 normally in spaced apart relation, as indicated in Fig. 1. This annular washer consists of a single stamping in the embodiment of the invention illustrated herein but it is realized a plurality of annular segments may be used if desired. An outer rigid washer 36 precludes the possibility of any chattering of the parts.

Projecting inwardly around the outer periphery of rotatable disk 22 are a plurality of studs 38 upon which are mounted a disc 40. This disk is free to slide axially along the stud for a limited distance, such movement being limited by the plates 22 and 24 respectively. This disk 40 has a friction facing 42 secured on each side of its annular periphery, which friction facing is adapted to be frictionally engaged by the disks 30 and 24 when the latter are compressed as about to be described. The friction facing is optional and may be dispensed with if desired.

Seated in an annular groove around the outer periphery of plate 30 is an electric coil 44, which coil may be continuous or consist of a plurality of segmental coil units. Upon energization of the coil 44 the disks 30 and 24 and 40 will become the armatures of an electromagnet and the disk 30 will be forced inwardly by the magnetic flux to compress the friction facings 42 on disk 40 between itself and the inner plate disk 24.

The friction disks are arranged in a novel relationship. The disks are composed of ferrous metal of alternate high and low carbon content. That is, in the embodiment of the invention disclosed in Fig. 1, and as described in my copending application, the two outer disks 24 and 30 are of high carbon steel while the central disk 40, which carries the friction facings 42, is of low carbon steel. A high carbon steel disk would be made from steel with a carbon content at about .6% or above while a low carbon steel disk would have a carbon content at about .15% or below. The high carbon steel disks provide an additional factor in the braking force exerted to retard the wheel. These disks possess permanent magnetic qualities and retain their magnetism after the coil has been de-energized. In this manner they assist in the manual application of the brake either prior to the energization of the coil or in the event that the electric power device is not functioning.

In place of the low carbon steel disks, cast iron disks may be substituted but the preferred arrangement is a disk assembly composed entirely of steel disks. Cast iron disks, although they contain a relatively high carbon content, are not permanently magnetizable and for this reason they form a satisfactory substitute for the low carbon steel disks. The high carbon content of cast iron does not cause cast iron to have qualities which permanently retain magnetism.

It will be noted that the ring disk 30 completes the closure for the outer end of the assembly, and likewise supports the magnet coils 44. The outer circumference of disk 24 is turned over as at 43 to form a substantially closed drum effect in which the assembly is housed against dirt. The inner face of stud 28 is provided with cam surfaces 48 adapted to engage corresponding cam surfaces on the head 50 of bolt 46. In this way rotation of the bolt head 50 will tend to force the same axially inward, thereby forcing disk 30 inwardly by means of nut 32 to compress the friction facings 42 between itself and disk 24.

The heads 50 of bolts 46 may be rotated manually through an integral arm 52 by means of linkage 54 which is connected as at 56 with a rotatable brake actuating rod 58.

For controlling the actuation of the brake, I have devised the mechanism in Fig. 3. This mechanism and its operation is described in detail in my copending application Patent No. 1,991,498. Suffice to say, the electric brakes and the coils are diagrammatically illustrated by the reference numerals 60 and 44, respectively. A control mechanism is shown in the form of a brake pedal 64 having mechanical connection with the rotatable actuating rod 58 through the linkage 76, 78, and the flexible spring connection 82 housed in the casing 80. The pedal is connected by means of the link 70 to two rheostat switches 72 and 74 of any desired type of rheostat. In this way the resistance in the circuit to the brake coils 44 may be controlled as desired.

In the embodiment of the invention illustrated in Figs. 4, 5, 6 and 7, the relative positions of the high and low carbon steel disks are reversed. The central disk is now the high carbon steel disk while the disks on either side thereof are of soft steel or cast iron composition. Fig. 4 is similar to Fig. 1 except in the following respects: The central rotatable disk 84 is of high carbon steel and as a result possesses permanent magnetic qualities. The disks 24' and 30' on either side thereof are of low carbon content, and are relatively soft as compared with the central disk. The construction has been further slightly altered by positioning the studs 38 closer to the wheel hub 14 thereby providing a slightly greater area of friction contact between the disks.

The permanent magnetic quality of the rotatable central disk 84 sets up a rotating magnetic field which upon energization of the coil 44 interacts with the magnetic field of the latter to produce a magnetic drag on the rotating disk. This magnetic drag acts as a definite braking force on the rotating disk tending to retard it and the wheel associated therewith. This force acts in addition to the frictional force exerted on the rotating disk and increases the power with which the brake is applied without requiring increased exertion on the part of the operator. In Fig. 5 I have shown the disk 84 in elevation.

Fig. 6 illustrates a modification of the plane faced friction disk 84. The disk is divided into a plurality of sections by radial slots 88. The ends of these slots may be brazed with non-permeable material 90. The division of the disk into sections enables the magnetized disk to set up magnetic poles in each of the sections. The magnetic poles will be alternately north and south around the disk. The rotating pole sections produce a magnetic reaction with the stationary magnetic field exerting a retarding force on the rotating disk.

Fig. 7 illustrates a disk construction which is possibly the preferred construction of those shown in this modification of the invention. The major portion or foundation of the disk 92 is composed of non-magnetic material such as brass or bronze. Rivets or buttons 94 of permanent magnetic qualities are inserted in the disk in any desirable manner such as that shown in the figure. These inserts provide a plurality of small magnetic fields which upon rotation of the disk in the magnetic field produced by the coil cause a cutting of magnetic flux tending to retard the rotation of the disk.

Various modifications of my structure may be apparent to those skilled in the art and for that reason I intend to limit myself only within the scope of the appended claims.

What I claim:

1. A friction disk brake comprising a plurality of coaxial disks adapted to be compressed magnetically, alternate disks of said plurality being formed of high and low carbon steel respectively.

2. A brake structure comprising magnetically operable frictionally engageable rotatable and nonrotatable ferrous elements of high and low carbon characteristics respectively.

3. A vehicle wheel brake mechanism comprising, in combination, a plurality of sets of interleaved friction disks composed alternately of high and low carbon steel, one set of disks being adapted to rotate with the wheel, another set being secured against rotation, and manually operable means for creating a magnetic flux through said disks tending to compress the same.

4. A brake structure comprising a plurality of interleaved friction elements possessing in alternate succession permanent and non-permanent magnetic properties, and means under manual control for creating a magnetic field including said disks to attract the same into frictional engagement.

5. A vehicle wheel brake mechanism comprising, in combination, a plurality of interleaved steel friction disks, said disks being alternately mounted for rotation and secured against rotation, magnetic means associated with said disks adapted upon energization to produce a magnetic flux through said disks and draw the same together into close frictional contact, certain of said disks being of high carbon steel for retaining magnetic characteristics for a relatively long period of time.

6. A vehicle wheel brake mechanism comprising, in combination, a plurality of interleaved disks alternately rotatably and non-rotatably mounted with respect to one another, magnetic means associated with said disks adapted upon energization to compress said disks into close frictional contact to retard the rotation of the wheel, manual means for compressing said disks into close frictional contact, certain of said disks possessing permanent magnetic qualities whereby they assist in the manual compression of said disks.

7. Vehicle brake mechanism comprising, in combination, a wheel, a friction disk adapted to rotate with said wheel, a second friction disk adjacent said first mentioned friction disk secured against rotation, manual means for urging said disks together to retard the rotation of the wheel, power means to operate in conjunction with said manual means for also urging said disks together to retard the rotation of the wheel, a variable controller for said power means, a manual control mechanism coupled with said manual means to control the operation thereof and coupled with said variable controller to control the operation of said power means, one of said disks possessing relatively permanent magnetic qualities adapted to assist in the manual application of the brake irrespective of the operation of the power means.

8. Brake mechanism comprising, in combination, magnetically operable frictionally engageable rotatable and non-rotatable ferrous elements, means for creating a magnetic field through said elements to draw them together into frictional engagement, certain of said rotatable elements possessing permanent magnetic properties adaptable to react with said magnetic field and produce a magnetic drag providing an additional retardation force.

9. Brake mechanism comprising, in combination, alternate rotatable and non-rotatable magnetizable friction disks, means for creating a magnetic field through said disks to draw the same into frictional contact, one of said rotatable disks being permanently magnetized, said disk adapted upon rotation to cut through said magnetic field and create a magnetic drag assisting the retardation of said rotatable disks.

10. A brake structure comprising magnetically operable frictionally engageable rotatable and non-rotatable ferrous elements, said rotatable elements being of relatively high carbon content to retain magnetic properties over a period of time.

11. A brake mechanism comprising magnetically operable frictionally engageable rotatable and non-rotatable ferrous elements, magnetic means associated with said disks and adapted upon energization to establish a magnetic field including said disks causing the same to draw together into frictional engagement, certain of said rotatable disks possessing relatively permanent magnetic qualities, said last mentioned disks adapted upon energization of said magnetic means to cut the magnetic field producing a magnetic drag which assists in the retardation of the rotatable disks.

12. Brake mechanism comprising, in combination, a pair of coaxial non-rotative friction disks and a rotatable friction disk between said pair of disks, means for establishing a magnetic field including said disks to draw them into frictional contact to thereby retard the rotation of said rotatable disk, said rotative disk possessing inherent magnetic properties adapted to react with said magnetic field to produce a magnetic drag acting as an additional force retarding the rotation of the same.

13. Brake mechanism comprising, in combination, magnetically operable rotatable and non-rotatable friction disks, means adapted to establish a magnetic field including said disks to draw the same into close frictional contact and retard the rotation of the rotatable disks, one of said rotatable disks possessing relatively permanent magnetic qualities, said disk provided with slots dividing the disk into magnetic pole sections, and means of non-permeable material positioned in said slots and stiffening the slotted disk into permanent formation.

14. A vehicle wheel brake mechanism comprising, in combination, a wheel, a friction element coupled with said wheel to rotate therewith, non-rotatable friction elements of magnetically permeable material on either side of said rotatable element, means for creating a magnetic flux through said elements to attract the same into close frictional engagement, said rotatable element being of non-permeable material but possessing inserts in permanent magnetized condition.

15. A friction disk brake comprising a plurality of coaxial disks adapted to be compressed magnetically, alternate disks of said plurality being formed with hardened high and low carbon steel respectively.

16. A magnetically operated brake mechanism comprising, in combination, a rotatable disk of high carbon steel interleaved with non-rotatable disks of low carbon steel, said high carbon steel disks having a permanently magnetized condition and providing a rotating magnetic field, stationary magnetic means associated with said disks and adapted upon energization to establish a stationary magnetic field encompassing said disks and acting to draw the same together into mechanical frictional engagement, said rotating and stationary magnetic fields adapted to react with one another to produce a magnetic friction which acts in addition to the mechanical friction to retard the rotation of the high carbon steel disk.

17. A magnetically operated brake mechanism comprising, in combination, a rotatable disk of non-magnetic material interleaved with disks of magnetizable material, said rotatable disk provided with a plurality of permanently magnetized inserts adapted to provide a plurality of small rotatable magnetic fields as the disk rotates, stationary magnetic means associated with said disks and adapted upon energization to establish a stationary magnetic field encompassing said disks and acting to draw the same together into mechanical frictional engagement, said plurality of rotating fields reacting with said stationary magnetic field to produce a magnetic friction which acts in addition to the mechanical friction to retard the rotation of the rotatable disk.

ADIEL Y. DODGE.